UNITED STATES PATENT OFFICE.

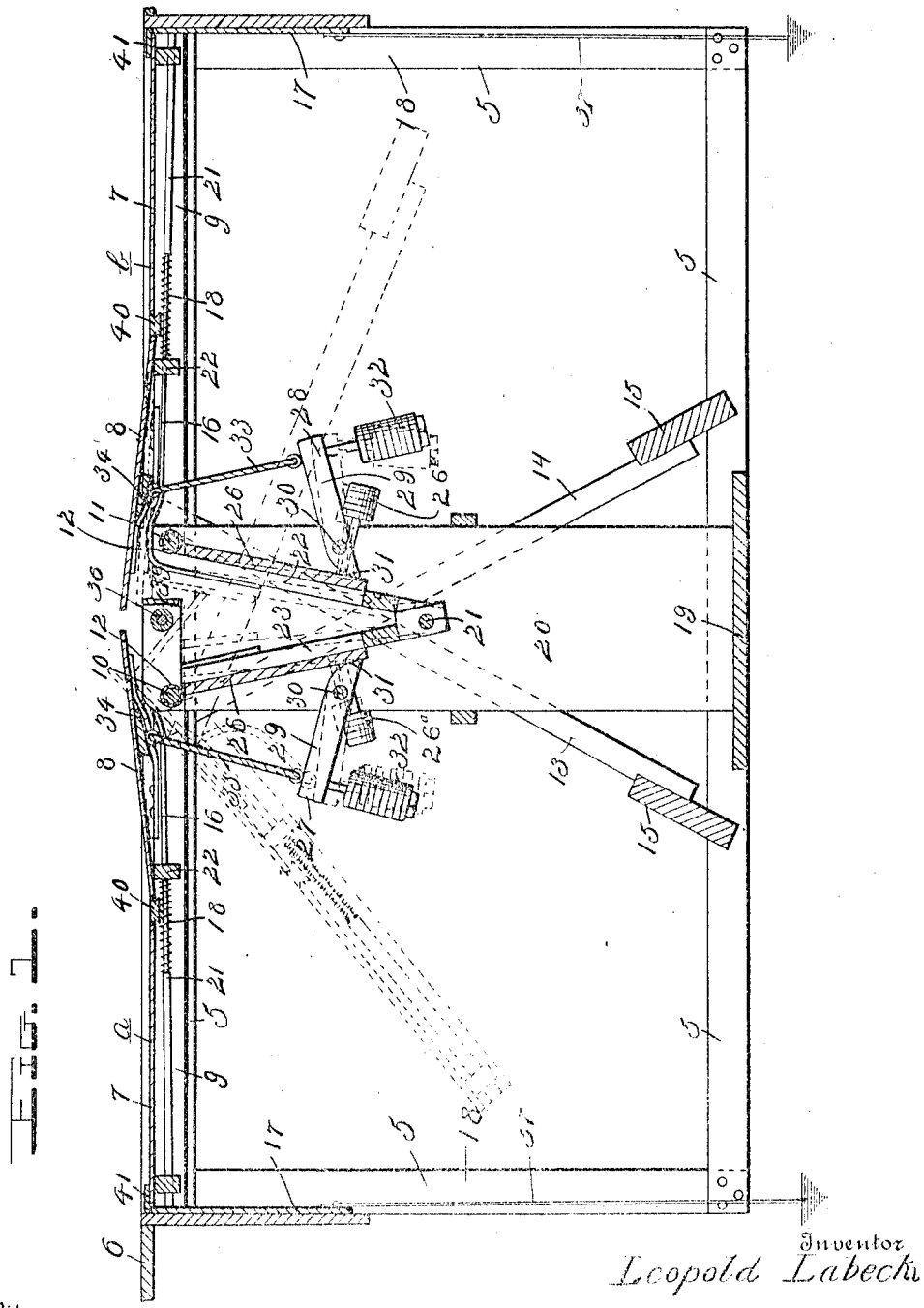

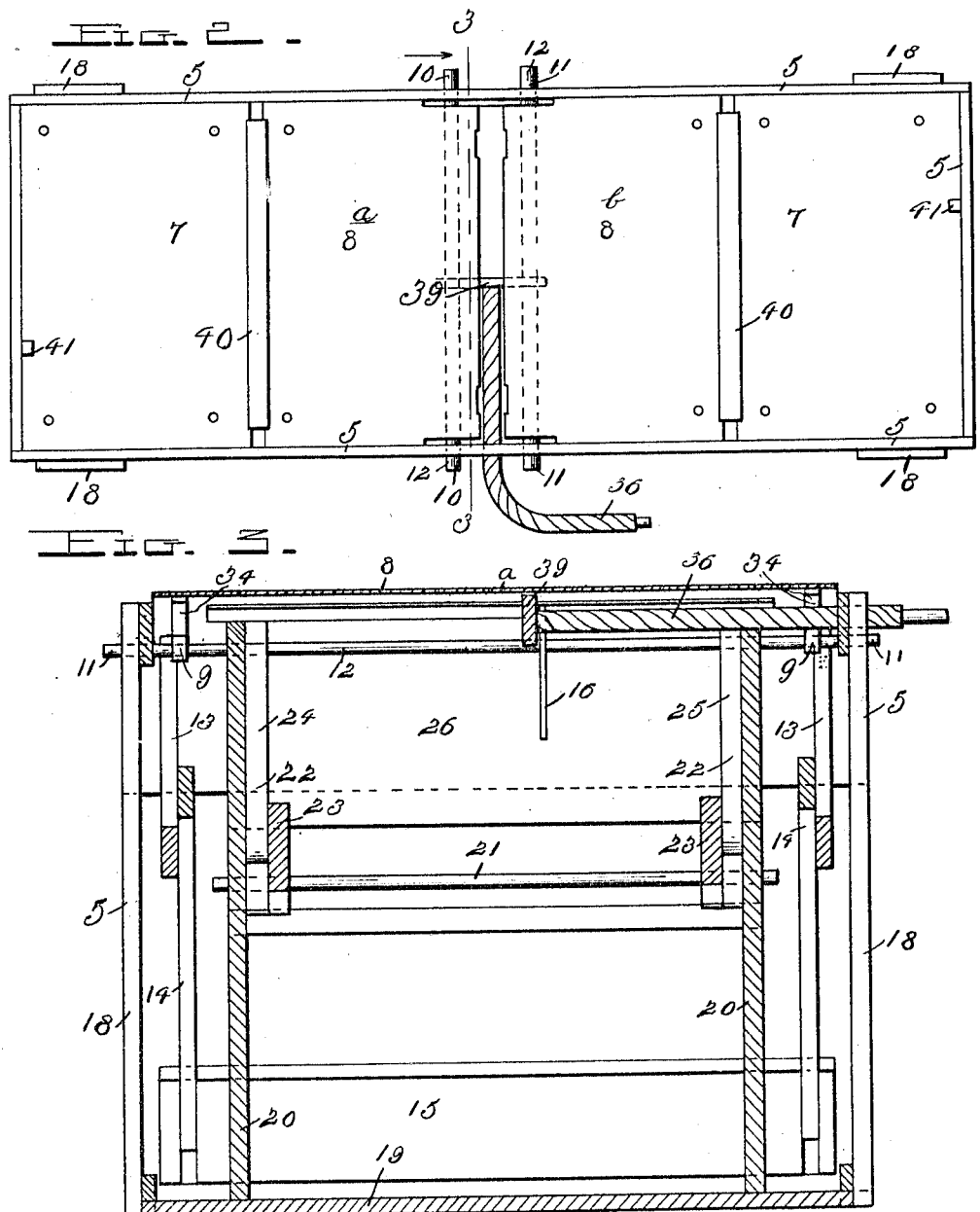

LEOPOLD LABECKI, OF PERTH AMBOY, NEW JERSEY.

TRAP.

1,039,299.  Specification of Letters Patent.  Patented Sept. 24, 1912.

Application filed July 27, 1911. Serial No. 640,965.

*To all whom it may concern:*

Be it known that I, LEOPOLD LABECKI, a citizen of the United States, residing at Perth Amboy, in the county of Middlesex and State of New Jersey, have invented new and useful Improvements in Traps, of which the following is a specification.

The general objects of the invention are to trap and kill animals; to automatically discharge the same from the trap; and to automatically set the trap after the discharging operation.

Other objects will appear and be better understood from that embodiment of my invention of which the following is a specification, reference being had to the accompanying drawings forming a part thereof, in which;

Figure 1 is a vertical section of one embodiment of the invention showing the same position in a floor and ready for use. Fig. 2 is a detail plan of the same. Fig. 3 is a vertical cross section on the line 3—3 of Fig. 2.

The trap shown in the drawings is especially designed for use in connection with catching rats in houses, barns and the like, and the preferred form of carrying out the invention is shown to consist of a frame 5 of wood or other nonconducting material arranged in an opening in the floor 6. The tilting platforms *a* and *b* consist of stationary metallic plates 7 and movable metallic plates or sections 8 arranged on frames 9 which may be pivotally supported on axles 10 and 11 arranged in spaced relation at the middle portion of the frame 5, the areas of the platforms corresponding approximately to the inner area of the frame 5 so that when the platforms are in operative position as shown in Fig. 1, their surfaces will be flush with the surface of the floor 6, or substantially so. The axles 10 and 11 are herein shown as being covered with rubber or other insulating material 12 and the sides of the frames 9 may be of wood or other suitable nonconducting material.

The platforms are held in position as shown in Fig. 1 by suitable means such as counter-weights which are consisted of stringers 13 and 14 depending from the inner ends of each of the frames 9 and connected at their lower ends by a weighted cross-piece 15. The combined weights of the stringers and cross piece of each platform are only a trifle greater than the weight of the platform so that the latter will move downwardly under a very slight pressure thereon. In the embodiment shown either platform is positively held against downward movement when an animal such as a rat, moves onto the stationary section 7 but when the animal moves onto the depressible section 8 the holding means is released, whereby, the platform descends and the animal is precipitated into the space therebelow. Any preferred means may be employed for producing this result, such as a latch bar 16 having one end adapted to engage or interlock with the keeper 17, the said latch bar being yieldingly held in engagement with the keeper by means of a spring 18 surrounding the latch bar and bearing on an extension 21 and on a crosspiece 22. The inner end portion of each latch bar is bent downwardly and extends into the space between the axles 10 and 11.

The frame 5 is herein shown as having depending portions 18 which are connected by a cross-piece 19 carrying uprights 20 which support an axle 21 on which are arranged the retractors 22 and 23 for the latch bars 16. The retractors may be of any suitable construction, the preferred form herein shown to consist of end pieces 24 and 25 connected by bearing plates 26 overbalanced by weights 26ª. The end pieces 24 and 25 are movable on the axle 21 and limited against outward and downward turning movement by abutting the axles 10 and 11 for the platforms. The downturned end portions of the latches bear on the inner faces of the bearing plates so that when the bearing plates are moved inwardly the latches will be retracted from the keepers. In order to automatically produce the last named result, I make use of a means herein shown to consist of weighted pushers 27 and 28. A pusher is provided for each bearing plate and may be formed in any suitable manner, the preferred form consisting in a block 29 movable on an axle 30 held by the uprights, the inner end of the block having a cam face 31 bearing on the adjacent surface of the bearing plate. The outer end of the block has a weight 32 which tends to turn the block, whereby, the cam face thereof will move the bearing plate inwardly, whereby, the latch bar will be moved longitudinally and out of engagement with its keeper. The block 29 is herein shown as connected to the movable platform section 8 by means of a flexible element 33 and the movable sections of the platform are herein shown as pivoted to the frames 9 and yieldingly held in inclined positions by means of bow springs 34 secured to the frames 9. The strength of the bow springs is sufficient to overcome the downward pull on the block produced by the weight 32 but when an animal, such as a rat moves onto the movable section the latter will move downwardly against the action of its springs, whereby, the weight will turn the block and the latter move the bearing plate for the purpose previously described. It is to be understood that I am not to be limited to this specific structure for retracting the latch bar since it will be manifest that the connection between the block and platform may be rigid, in which event, of course, the weight will be dispensed with.

Any preferred means may be employed for killing the animals either before or after the platforms move downwardly. If it is desired to kill the animals by drowning, a vessel, holding water or other suitable liquid, may be placed at a position below the trap so that the animals will be precipitated thereinto when the platform upon which the animal bears moves downwardly. The preferred form of killing the animals, however, is by electricity. This is effected by using a grounded circuit in which the platform is included, and employing either of the movable sections as a circuit closer.

Referring to the drawings a wire 36 passes through the frame 5 and connects to a contact plate 39, underlying the free ends of the movable sections 8. The wire 36 is connected in the usual manner with any source of electric energy having sufficient voltage to kill an animal such as a rat.

37—37 are wires which extend into the ground at one end and are connected at their opposite ends to metallic stops 41—41 with which the free ends of the platforms contact when in horizontal position. With this construction it will be seen that when the parts are set as shown in Fig. 1, and a rat on the stationary section of the platform places his feet on the movable section, the latter will be pressed into engagement with the contact 39, whereby, the circuit will be completed through the rat's body at substantially the same time as the latch is withdrawn so that as the platform moves downwardly under the weight of the rat as before described, the dead rat will be precipitated into the space below the trap. Referring to Figs. 1 and 2 it will be seen that the sections of the platform are insulated from each other by means of a cross piece 40 formed of glass or other nonconducting material, so as to prevent arcing between the sections when one is depressed.

Although I have shown and described one embodiment of the invention it is to be understood that I am not to be limited to the specific arrangement and construction of parts since various changes may be made, within the scope of the appended claims without departing from the spirit or sacrificing any of the advantages of the invention.

What I claim as new is:

1. In an animal trap, the combination with a supporting frame and a normally open electric circuit connected to spaced contact plates carried by the frame; of a tilting platform carried by the frame and including metallic sections insulated from each other one of which is normally in contact with one of said contact plates and the other of which is arranged so as to move under the weight of an animal into contact with the other of said contact plates.

2. In an animal trap, the combination with a supporting frame and a normally open electric circuit connected to spaced contact plates carried by the frame; of a platform pivotally connected to the frame and having spaced metallic plates insulated from each other one of which is normally in contact with one of the contact plates and the other of which is yieldingly held in spaced relation to the other of said contact plates and adapted to be depressed by the weight of an animal thereon into contact with the last-named contact plate, a latch for latching the platform to the frame, and means operated by the depression of the second-named section of the platform to unlatch the latch.

LEOPOLD LABECKI.

In presence of—
  JOHN SEAMAN,
  JOHN M. LABECKI.